April 20, 1965 D. H. BURNS 3,179,218
ROLLER HYSTERESIS CLUTCH
Filed June 29, 1961 2 Sheets-Sheet 1
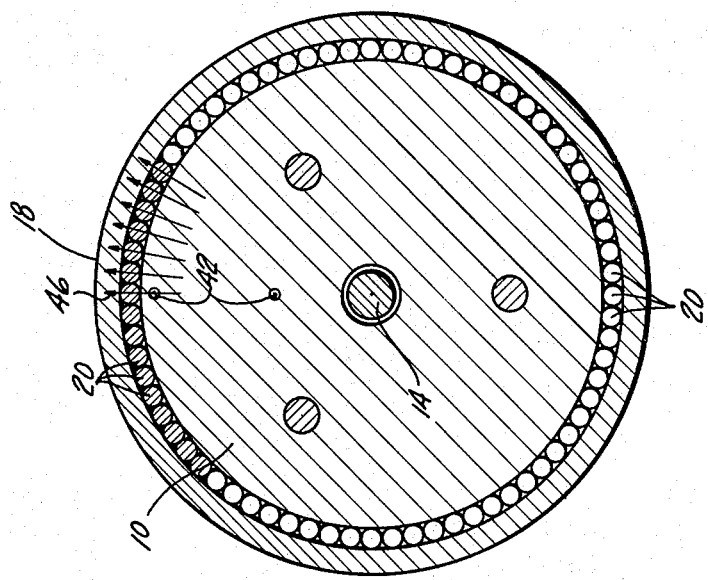
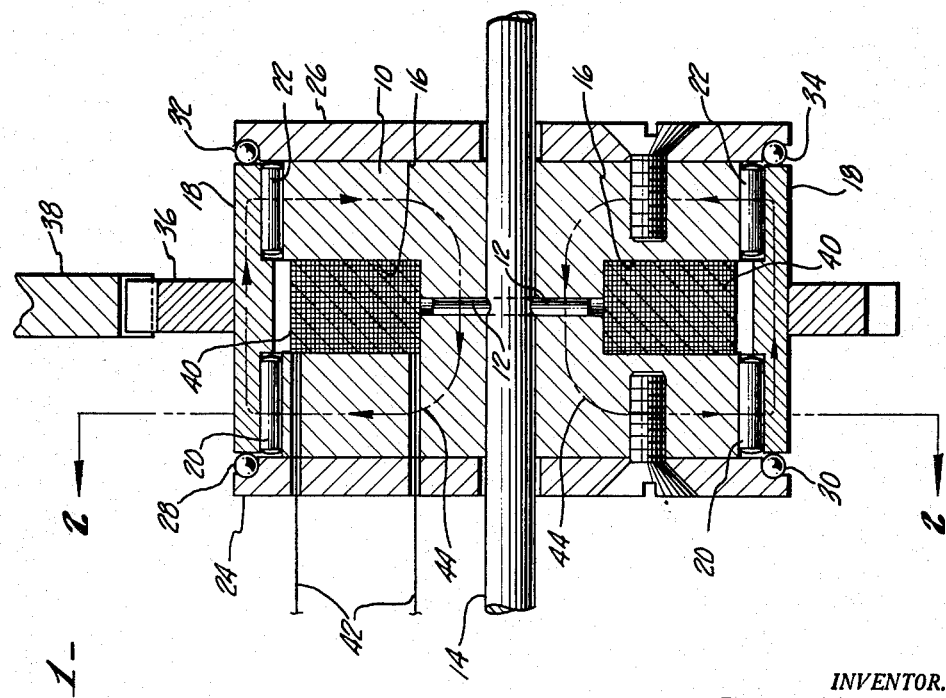
INVENTOR.
DAVID H. BURNS
BY Christie, Parker & Hale
ATTORNEYS.

April 20, 1965   D. H. BURNS   3,179,218
ROLLER HYSTERESIS CLUTCH
Filed June 29, 1961   2 Sheets-Sheet 2
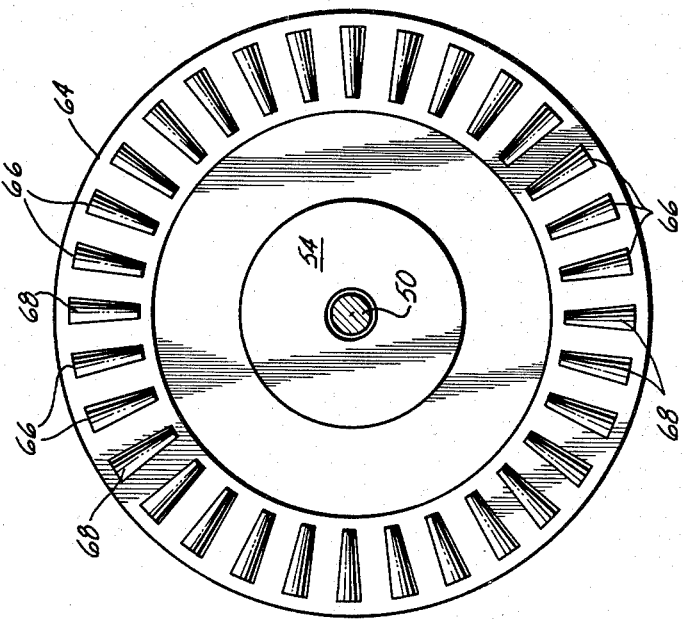
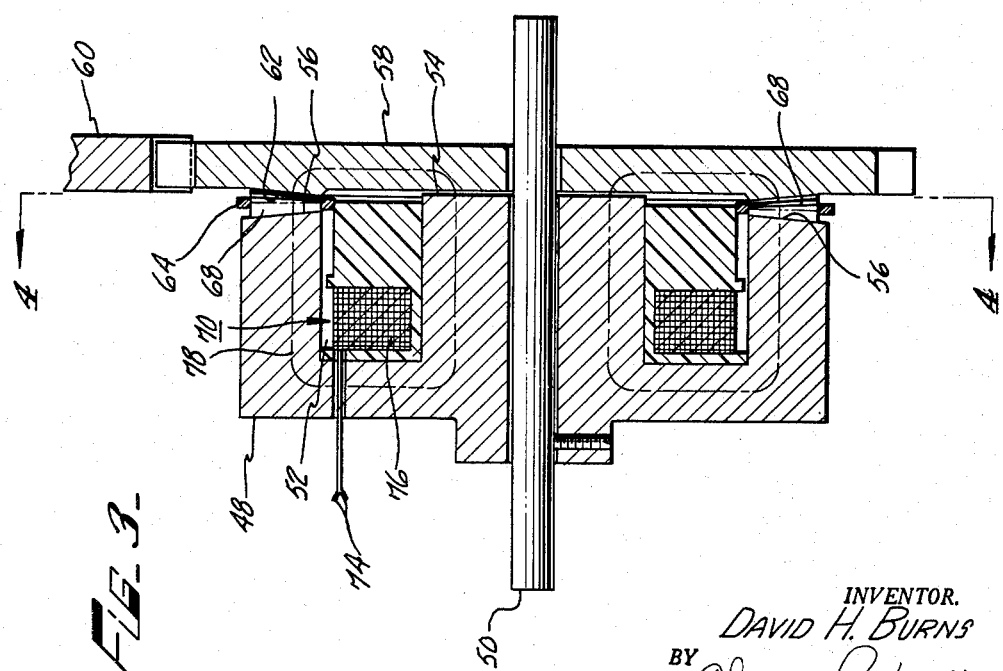
INVENTOR.
DAVID H. BURNS
BY Christie, Parker & Hale
ATTORNEYS.

3,179,218
ROLLER HYSTERESIS CLUTCH
David H. Burns, Los Angeles, Calif., assignor to Telautograph Corporation, Los Angeles, Calif., a corporation of Virginia
Filed June 29, 1961, Ser. No. 120,663
1 Claim. (Cl. 192—21.5)

This invention relates to torque transfer devices and more particularly to an improved electrically controlled clutch employing hysteresis effects.

In many electromechanical systems it is desired to accurately control the movement of mechanical members in response to electrical signals. One device for providing such controlled movement is an electrically controllable clutch. Generally, such clutches provide a slipping friction contact between clutch elements, the degree of slippage therebetween being controllable by the magnitude of the current signal applied to the clutch. Such clutches, to provide a torque transfer which is substantially proportional to the current signal applied thereto, however, generally require close tolerances between the clutch elements. Further, due to the friction contact between the clutch elements, these clutches require a relatively rugged design utilizing physically hard elements which may be difficult to machine.

In view of this, the present invention provides an electrically controllable clutch wherein the tolerances between clutch elements are not critical. The clutch provides a substantially proportional torque output and utilizes relatively soft materials which are easily machined.

To accomplish this, the present invention provides a clutch employing hysteresis effects to provide a torque transfer between clutch elements which is substantially proportional to the magnitude of a current signal applied to the clutch.

More particularly, a basic form of the present invention includes first and second clutch elements of soft magnetic material which are mounted for relative movement about their axes of rotation. Disposed between the clutch elements and maintaining continuous contact therewith are a plurality of roller bearings of hard magnetic material having a high flux remanence. Accordingly, the clutch elements are normally free to rotate relative to each other with a minimum of friction.

To produce the desired torque transfer between the clutch elements, means are included within one of the clutch elements for generating a magnetic field proportional to the current applied thereto. In particular, the magnetic field magnetizes one of the clutch elements to a north magnetic pole and the other clutch element to a south magnetic pole. Thus, as one of the clutch elements rotates relative to the other, the roller bearings are caused to roll over a clutch element through the magnetic field. In so doing, the magnetic material of each roller bearing is forced through its hysteresis loop such that a force, which may be termed a hysteresis force, is set up on the first and second clutch elements opposing the movement of the moving clutch element and tending to cause the other clutch element to rotate with the moving clutch element. This hysteresis force is proportional to the area of the hysteresis loop of the magnetically hard material. By varying the magnitude of the current signal to increase the magnetizing force, the magnitude of the hysteresis force is increased up to saturation of the roller bearings. In particular, it has been found that the torque transfer between clutch elements increases in a substantially proportional manner with the magnitude of the current applied to the clutch.

Accordingly, the present invention, by providing a continuous roller bearing contact between clutch elements does not require the critical close tolerances between clutch elements of the prior art, and by utilizing magnetically soft material for the clutch elements, which are generally also physically soft, the present invention provides a clutch design which may be readily machined.

For a more complete understanding of the present invention, reference should be made to the following detailed description when considered with the drawings, in which:

FIGURES 1 and 2 are diagrammatic representations of an embodiment of the clutch utilizing the hysteresis design of the present invention; and FIGURES 3 and 4 are diagrammatic representations of another embodiment of the present invention.

As represented in FIGURES 1 and 2, the present invention includes first and second clutch elements of soft magnetic material mounted for relative movement about their axes of rotation. In particular, the first clutch element includes a drum 10 pinned at 12 for movement with a shaft 14. Further, as shown, the drum 10 includes an annular slot 16 around the periphery of the drum 10.

As illustrated in FIGURE 1, the second clutch element of the present invention includes a hollow cylinder 18 of soft magnetic material which is radially disposed for rotation around the drum 10. To provide substantially free rotation between the clutch elements, a first and second plurality of cylindrical roller bearings represented at 20 and 22, respectively, are disposed around the periphery of the drum 10 on either side of the slot 16. These roller bearings, as illustrated, maintain continuous rolling contact with the cylinder 18 and the drum 10.

To prevent lateral movement of the cylinder 18, the present invention, as represented in FIGURE 1, includes two retaining disks 24 and 26, respectively. As represented, the retaining disks 24 and 26 are coupled to the drum 10 for rotation therewith. To provide a substantially friction-free contact between the retainers 24 and 26 and the cylinder 18, the present invention includes a plurality of ball bearings, four of which are represented at 28, 30, 32, and 34, respectively. Accordingly, the drum 10 and the cylinder 18 are free to rotate relative to each other with a minimum of friction. To provide rotational movement for the cylinder 18, the cylinder 18 includes a toothed wheel, represented at 36, which is driven by a second toothed wheel represented at 38. Accordingly, in the embodiment of the present invention as represented in FIGURES 1 and 2, it is desired to transfer torque from the moving cylinder 18 to the drum 10, the torque output being taken from the shaft 14.

To provide the desired clutch action of the present invention, a coil bobbin assembly, represented at 40, is included within the annular slot 16. In particular, a current signal applied over the coil leads, represented at 42, to the coil bobbin assembly 40 generates a magnetic field, the flux path of which is represented by the broken line 44. Thus, as illustrated, a magnetic field having a flux path is set up which passes from the drum 10 radially across the roller bearings 20 longitudinally along the cylinder 18, radially through the roller bearings 22, to the drum 10.

In operation, as the cylinder 18 is rotated relative to the drum 10, the roller bearings 20 and 22 are caused to roll over the periphery of the drum 10. In so doing, the roller bearings pass through the magnetic field set up by the coil bobbin assembly. As the roller bearings rotate, the magnitude of the magnetizing force relative to a given physical cross-sectional axis of the roller bearings varies. With the roller bearing 20 in the position as shown in FIGURE 2, the magnetizing force acting upon the cross-sectional axis aligned with the magnetizing force represented by the arrow 46 is maximum. However, as the roller bearing 20 rotates ninety degrees (90°), the magnitude of the magnetizing force acting on the given cross-sectional axis decreases to zero, while, when the roller bearing 20 has rotated one hundred and eighty degrees (180°), the magnetizing force relative to the physical cross-sectional axis is again of maximum magnitude but of opposite polarity. Thus, as the roller bearing 20 rolls through three hundred and sixty degrees (360°), it is forced through its inherent hysteresis loop.

As is commonly known, to force a magnetic material through its hysteresis loop requires a finite amount of energy which is proportional to the area enclosed by the hysteresis loop. In the case of the present invention, the energy required to rotate a roller bearing, such as 20, through three hundred and sixty degrees (360°) sets up a force termed the hysteresis force opposing this movement. In particular, the hysteresis force of each roller bearing acts on the drum 10 and the cylinder 18 to oppose any relative movement between the cylinder 18 and the drum 10, causing the drum 10 to rotate with the cylinder 18. Accordingly, as the cylinder 18 is rotated relative to the drum 10 torque is transferred to the drum 10.

To vary the torque transferred from the cylinder 18 to the drum 10, the magnitude of the current applied to the coil bobbin assembly 40 is varied. As the magnitude of the current signal is increased, the magnetizing force is likewise increased. In turn, as the magnetizing force acting on the roller bearings increases, the area of the hysteresis loop for the hard magnetic material increases, thereby increasing the magnitude of the hysteresis force. In practice it has been found that so long as the magnetizing force is not great enough to saturate the roller bearings 20 and 22, the torque applied to the drum 10 increases substantially in direct proportion to the magnitude of the current applied to the coil bobbin assembly 40.

Although the above description has described a clutch utilizing hysteresis effects, it is to be understood that if the drum 10 were stationary and a magnetic field set up as described above, the device shown in FIGURES 1 and 2 would embody a hysteresis brake tending to retard and stop the motion of the cylinder 18.

Referring to FIGURES 3 and 4, there is shown in schematic form another embodiment of the present invention. As illustrated, this embodiment of the invention includes first and second clutch elements of soft magnetic material mounted for relative movement about their axes of rotation. As shown, the first clutch element includes a drum 48 which is pinned to a shaft 50 for rotation therewith. Further, disposed within the drum 48 is an annular slot 52. As shown, the annular slot 52 divides a radial surface of the drum 48 into inner and outer planar surfaces 54 and 56, respectively. As shown, the inner planar surface 54 projects beyond the plane of the outer planar surface 56. Further, the outer planar surface 56 is tapered radially away from the plane of the inner planar surface 54.

As illustrated in FIGURE 3, the second clutch element includes a disk 58 of soft magnetic material. As represented, the disk 58 is mounted for free rotation around the shaft 50. By way of example only, the disk 58 comprises a toothed gear wheel which, in conjunction with a gear wheel, a portion of which is represented at 60, is caused to move relative to the drum 48. As is further represented in FIGURE 3, the disk 58 has an inner surface that includes the circular portion represented at 62 and is tapered radially away from the plane of the inner planar surface of the drum 48.

To provide for a substantially friction-free rotation between the disk 58 and the drum 48, the present invention as illustrated in FIGURES 3 and 4, includes a cage 64 of non-magnetic material disposed between the drum 48 and the disk 58. As represented, the cage 64 is disposed around the periphery of the inner planar surface 54 and includes a plurality of radial slots 66 that are radially tapered toward the center of the shaft 50.

As represented in FIGURE 3, to provide a continuous low friction contact between the drum 48 and the disk 58, a plurality of tapered needle roller bearings are included. In particular, a bearing 68 is disposed in each of the radial slots 66 and maintains continuous rolling contact between the outer planar surface 56 and the tapered portion 62 of the disk 58. Accordingly, the disk 58 is free to rotate with low friction relative to the drum 48 by movement of the gear wheel 60.

To provide the desired clutch action of the present invention, a coil bobbin assembly, represented generally at 70, is included within the annular slot 52.

In operation, in providing the clutch action of the present invention, as the disk 58 is rotated a current signal is applied to the leads 74 which energizes the coil represented at 76 to generate a magnetic field having a flux path denoted by the dotted line 78. Thus, upon energization of the coil bobbin assembly 70, a magnetic field is set up having a flux path which passes from the drum 48 radially through the roller bearings 68, radially through the disk 58, returning to the drum 48. Thus, as the disk 58 rotates relative to the drum 48, the roller bearings 68 are caused to roll over the outer planar surface 56 through the magnetic field. As previously described, this produces a hysteresis force which acts upon the disk 58 and the drum 48 in opposition to the movement of the disk 58 and tending to cause the drum 48 to rotate with the disk 58. In particular, it has been found in practice that the torque transfer to the drum 48 is substantially proportional to the magnitude of the current applied to the coil bobbin assembly 70.

As in the embodiment described in connection with FIGURES 1 and 2, the embodiment shown in FIGURES 3 and 4 may produce a braking action. If the drum 48 is stationary, application of a current signal to the coil bobbin assembly 70 produces a hysteresis force acting upon the disk 58 to tend to reduce the movement of the disk 58.

What is claimed is:

A roller hysteresis clutch comprising: a drum of soft magnetic material having an annular slot centrally disposed along its longitudinal axis, said drum being mounted for movement about its axis of rotation; a first plurality of needle-like roller bearings disposed around the periphery of said drum adjacent to one side of said annular slot, said roller bearings being composed of a magnetic material having a high flux remanence; a second plurality of needle-like roller bearings disposed around the periphery of said drum adjacent to another side of said annular slot, said roller bearings being composed of a magnetic material having a high flux remanence; an annular shroud of soft magnetic material disposed for rotation around said drum in continuous contact with said first and second plurality of roller bearings; a coil bobbin assembly disposed within said annular slot for generating a magnetic field having a flux path which extends from said drum radially outwardly from the axis of rotation of the drum through said first plurality of roller bearings into the annular shroud, longitudinally through said annular shroud, radially inwardly toward the axis of rotation of the drum through said second plurality of roller bearings to said drum; and means for rotating said annular shroud around said drum to cause said first and second plurality of roller bearings to roll on the periphery of said drum through said magnetic field to produce a hysteresis force upon said drum causing it to rotate with said annular shroud.

References Cited by the Examiner

UNITED STATES PATENTS

| 1,334,759 | 5/20 | Huebner | 192—40 |
|---|---|---|---|
| 2,596,654 | 5/52 | Clark et al. | 308—183 X |
| 2,718,292 | 9/55 | Meilander et al. | 192—40 |
| 3,034,365 | 5/62 | Stieber | 192—30 X |

DAVID J. WILLIAMOWSKY, Primary Examiner.

THOMAS J. HICKEY, Examiner.